US 7,441,033 B2

(12) United States Patent
Chidambaran et al.

(10) Patent No.: US 7,441,033 B2
(45) Date of Patent: *Oct. 21, 2008

(54) ON DEMAND NODE AND SERVER INSTANCE ALLOCATION AND DE-ALLOCATION

(75) Inventors: Lakshminarayanan Chidambaran, Sunnyvale, CA (US); James W. Stamos, Saratoga, CA (US); Rajendra Pingte, Foster City, CA (US); Edwina Lu, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 875 days.

This patent is subject to a terminal disclaimer.

(21) Appl. No.: 10/917,687

(22) Filed: Aug. 12, 2004

(65) Prior Publication Data

US 2005/0038789 A1    Feb. 17, 2005

Related U.S. Application Data

(60) Provisional application No. 60/500,096, filed on Sep. 3, 2003, provisional application No. 60/500,050, filed on Sep. 3, 2003, provisional application No. 60/495,368, filed on Aug. 14, 2003.

(51) Int. Cl.
*G06F 15/173* (2006.01)
*G06F 12/00* (2006.01)
(52) U.S. Cl. ...................... 709/226; 709/219
(58) Field of Classification Search ............... 709/227, 709/226, 223–225, 250, 219
See application file for complete search history.

(56) References Cited

U.S. PATENT DOCUMENTS

| 5,758,345 A | 5/1998 | Wang |
| 5,774,668 A | 6/1998 | Choquier et al. |
| 5,890,167 A | 3/1999 | Bridge, Jr. et al. |
| 5,918,059 A | 6/1999 | Tavallaei et al. |
| 5,951,694 A | 9/1999 | Choquier et al. |
| 6,041,357 A | 3/2000 | Kunzelman et al. |
| 6,088,728 A | 7/2000 | Bellemore et al. |
| 6,178,529 B1 | 1/2001 | Short et al. |
| 6,243,751 B1 | 6/2001 | Chatterjee et al. |
| 6,272,503 B1 | 8/2001 | Bridge et al. |
| 6,327,622 B1 | 12/2001 | Jindal et al. |

(Continued)

FOREIGN PATENT DOCUMENTS

EP    0 942 363 A2    9/1999

(Continued)

OTHER PUBLICATIONS

International Searching Authority, "Notification of Transmittal of the International Search Report and the Written Opinion of the International Searching Authority, or the Declaration," Aug. 4, 2005, 13 pages.

(Continued)

*Primary Examiner*—Zarni Maung
(74) *Attorney, Agent, or Firm*—Hickman Palermo Truong & Becker

(57) ABSTRACT

An approach efficiently and dynamically allocates and de-allocates database instances and nodes between databases. The approach performs this function in a way that accounts for the users of and services hosted by multiple databases.

26 Claims, 7 Drawing Sheets

U.S. PATENT DOCUMENTS

| | | | |
|---|---|---|---|
| 6,556,659 B1* | 4/2003 | Bowman-Amuah | 379/9.04 |
| 6,587,866 B1 | 7/2003 | Modi et al. | |
| 6,601,101 B1 | 7/2003 | Lee et al. | |
| 6,667,751 B1 | 12/2003 | Wynn et al. | |
| 6,728,748 B1 | 4/2004 | Mangipudi et al. | |
| 6,816,907 B1 | 11/2004 | Mei et al. | |
| 7,024,394 B1 | 4/2006 | Ashour et al. | |
| 7,058,957 B1 | 6/2006 | Nguyen | |
| 7,107,294 B2 | 9/2006 | Romanufa et al. | |
| 7,174,379 B2* | 2/2007 | Agarwal et al. | 709/226 |
| 7,178,050 B2 | 2/2007 | Fung et al. | |
| 7,263,590 B1 | 8/2007 | Todd et al. | |
| 7,269,157 B2 | 9/2007 | Klinker et al. | |
| 2001/0056493 A1 | 12/2001 | Mineo | |
| 2002/0073139 A1 | 6/2002 | Hawkins et al. | |
| 2002/0129157 A1* | 9/2002 | Varsano | 709/232 |
| 2002/0161896 A1 | 10/2002 | Wen et al. | |
| 2002/0194015 A1 | 12/2002 | Gordon et al. | |
| 2003/0005028 A1 | 1/2003 | Dritschler et al. | |
| 2003/0007497 A1 | 1/2003 | March et al. | |
| 2003/0063122 A1 | 4/2003 | Cichowlas et al. | |
| 2003/0088671 A1 | 5/2003 | Klinker et al. | |
| 2003/0108052 A1 | 6/2003 | Inoue et al. | |
| 2003/0135642 A1 | 7/2003 | Benedetto et al. | |
| 2003/0208523 A1* | 11/2003 | Gopalan et al. | 709/201 |
| 2003/0217159 A1 | 11/2003 | Schramm-Apple et al. | |
| 2004/0111506 A1 | 6/2004 | Kundu et al. | |
| 2004/0117794 A1 | 6/2004 | Kundu | |
| 2004/0176996 A1* | 9/2004 | Powers et al. | 705/11 |
| 2004/0268357 A1 | 12/2004 | Joy et al. | |
| 2005/0021771 A1 | 1/2005 | Kaehn et al. | |
| 2005/0165925 A1* | 7/2005 | Dan et al. | 709/224 |
| 2005/0239476 A1 | 10/2005 | Betrabet et al. | |
| 2005/0267965 A1 | 12/2005 | Heller | |
| 2006/0036617 A1 | 2/2006 | Bastawala et al. | |
| 2007/0226323 A1 | 9/2007 | Halpern | |

FOREIGN PATENT DOCUMENTS

| | | |
|---|---|---|
| EP | 0942363 A2 | 9/1999 |
| EP | 0 992 909 A2 | 4/2000 |
| EP | 1 170 662 A2 | 1/2002 |
| WO | WO 02/05116 A2 | 1/2002 |
| WO | WO 02/07037 A1 | 1/2002 |
| WO | WO 02/097676 A2 | 12/2002 |
| WO | WO 03/014928 A1 | 2/2003 |
| WO | WO 03/014928 A2 | 2/2003 |
| WO | WO 03/062983 A2 | 7/2003 |

OTHER PUBLICATIONS

Current Claims for International Application No. PCT/US2004/026389, pp. 1-7.

Jeffrey S. Chase et al., "Dynamic Virtual Clusters in a Grid Site Manager," Proceedings of the 12th IEEE International Symposium on High Performance Distributed Computing (HPDC'03), 2003, IEEE, pp. 90-100.

European Patent Office, "International Preliminary Report on Patentability," Aug. 26, 2005, International Application No. PCT/US2004/026570, 9 pages.

International Searching Authority, "Notification of Transmittal of the International Search Report and the Written Opinion of the International Searching Authority, or the Declaration," Aug. 25, 2005, 12 pages.

Current Claims for International Application No. PCT/US2004/026445, pp. 1-5.

Henry Song, et al., "Browser State Repository Service," Lecture Notes in Computer Science, vol. 2414, 2002, pp. 1-14, XP002904339.

Eric Skow, et al., "A Security Architecture for Application Session Handoff," 2002, IEEE International Conference Proceedings, Apr. 28-May 2, 2002, vol. 1 of 5, pp. 2058-2063, XP010589848.

International Preliminary Examining Authority, "Written Opinion of the International Preliminary Examining Authority," Jun. 7, 2005, 4 pages.

Current Claims of International Application No. PCT/US04/26570, 4 pages.

Patent Cooperation Treaty, "Notification of Transmittal of the International Preliminary Report on Patentability," PCT/US2004/026405, dated Oct. 10, 2006, 7 pages.

Amended Claims, PCT/US2004/026405, dated Apr. 6, 2006, 4 pages (attached).

Chase, Jeffrey S., "Dynamic Virtual Clusters in a Grid Site Manager," Proceedings of the IEEE International Symposium on HPDC-2003, XP010463715, pp. 90-100.

International Searching Authority, "Notification of the Transmittal of the International Search Report and the Written Opinion of the International Searching Authority, or the Declaration", PCT/US2004/026405, dated Aug. 19, 2005, 5 pages.

Claims, PCT/US2004/026405, 7 pages.

International Searching Authority, "Notification of Transmittal of the International Preliminary Report on Patentability," PCT/US2004/026445, dated Dec. 12, 2005, 6 pages.

Claims as Amended, PCT/US2004/026445, Aug. 11, 2005, 4 pages (attached).

Ravi Kokku et al., "Half-pipe Anchoring: An Efficient Technique for Multiple Connection Handoff," Proceedings 10th International Conference on Network Protocols, Nov. 12, 2002, XP010632563, 10 pages.

Ying-Dar Lin et al., "Direct Web Switch Routing with State Migration, TCP Masquerade, and Cookie Name Rewriting," Globecom 2003, IEEE Global Telecommunications Conference, Dec. 1, 2003, IEEE, CP010677300, pp. 3663-3667.

International Seraching Authority, "Notification of Transmittal of the International Search Report and the Written Opinion of the International Searching Authority, or the Declaration," Nov. 12, 2004, 13 pages.

Current Claims of International Application No. PCT/US2004/026570, 4 pages.

Current Claims of International Application No. PCT/US2004/025805, 8 pages.

International Searching Authority, "Notification of Transmittal of the International Search Report and the Written Opinion of the International Searching Authority, or the Declaration," dated Dec. 3, 2004, 12 pages.

International Preliminary Examining Authority, "Notification of Transmittal of International Preliminary Report on Patentability," PCT/US2004/025805, dated Nov. 18, 2005, 16 pages.

"Office Action" received in U.S. Appl. No. 11/057,043 dated Apr. 9, 2008, 19 pages.

"Office Action" received in related case U.S. Appl. No. 10/917,661, filed Aug. 12, 2004, 9 pages.

"Office Action" received in related case U.S. Appl. No. 10/918,056, filed Aug. 12, 2004, 9 pages.

\* cited by examiner

ON DEMAND NODE AND SERVER INSTANCE ALLOCATION AND DE-ALLOCATION

RELATED APPLICATIONS

The present application claims priority to U.S. Provisional Application No. 60/495,368, Computer Resource Provisioning, filed on Aug. 14, 2003, which is incorporated herein by reference; the present application claims priority to U.S. Provisional Application No. 60/500,096, Service Based Workload Management and Measurement in a Distributed System, filed on Sep. 3, 2003, which is incorporated herein by reference; the present application claims priority to U.S. Provisional Application No. 60/500,050, Automatic And Dynamic Provisioning Of Databases, filed on Sep. 3, 2003, which is incorporated herein by reference.

The present application is related to the following U.S. Applications:

U.S. application Ser. No. 10/718,747, Automatic and Dynamic Provisioning of Databases, filed on Nov. 21, 2003, which is incorporated herein by reference;

U.S. application Ser. No. 10/917,873, Hierarchical Management of the Dynamic Allocation of Resources in a Multi-Node System, filed by Benny Souder, et al. on the equal day herewith, and incorporated herein by reference;

U.S. application Ser. No. 10/917,953, Transparent Session Migration Across Servers, filed by Sanjay Kaluskar, et al. on the equal day herewith and incorporated herein by reference;

U.S. application Ser. No. 10/917,661, Calculation of Service Performance Grades in a Multi-Node Environment That Hosts the Services, filed by Lakshminarayanan Chidambaran, et al. on the equal day herewith and incorporated herein by reference;

U.S. application Ser. No. 10/918,055, Incremental Run-Time Session Balancing in a Multi-Node System filed by Lakshminarayanan Chidambaran, et al. on the equal day herewith and incorporated herein by reference;

U.S. application Ser. No. 10/918,056, Service Placement for Enforcing Performance and Availability Levels in a Multi-Node System, filed by Lakshminarayanan Chidambaran, et al. on the equal day herewith and incorporated herein by reference;

U.S. application Ser. No. 10/918,054, Recoverable Asynchronous Message Driven Processing in a Multi-Node System, filed by Lakshminarayanan Chidambaran, et al. on the equal day herewith and incorporated herein by reference; and U.S. application Ser. No. 10/917,715, Managing Workload by Service, filed by Carol Colrain, et al. on the equal day herewith and incorporated herein by reference.

FIELD OF THE INVENTION

The present invention relates to work load management, and in particular, work load management within a multi-node computer system.

BACKGROUND OF THE INVENTION

Enterprises are looking at ways of reducing costs and increasing efficiencies of their data processing system. A typical enterprise data processing system allocates individual resources for each of the enterprise's applications. Enough resources are acquired for each application to handle the estimated peak load of the application. Each application has different load characteristics; some applications are busy during the day; some others during the night; some reports are run once a week and some others once a month. As a result, there is a lot of resource capacity that is left unutilized. Grid computing enables the utilization or elimination of this unutilized capacity. In fact, grid computing is poised to drastically change the economics of computing.

A grid is a collection of computing elements that provide processing and some degree of shared storage; the resources of a grid are allocated dynamically to meet the computational needs and priorities of its clients. Grid computing can dramatically lower the cost of computing, extend the availability of computing resources, and deliver higher productivity and higher quality. The basic idea of grid computing is the notion of computing as a utility, analogous to the electric power grid or the telephone network. A client of the grid does not care where its data is or where the computation is performed. All a client wants is to have computation done and have the information delivered to the client when it wants.

This is analogous to the way electric utilities work; a customer does not know where the generator is, or how the electric grid is wired. The customer just asks for electricity and gets it. The goal is to make computing a utility—a ubiquitous commodity. Hence it has the name, the grid.

This view of grid computing as a utility is, of course, a client side view. From the server side, or behind the scenes, the grid is about resource allocation, information sharing, and high availability. Resource allocation ensures that all those that need or request resources are getting what they need. Resources are not standing idle while requests are left unserviced. Information sharing makes sure that the information clients and applications need is available where and when it is needed. High availability ensures that all the data and computation must always be there—just as a utility company must always provide electric power.

Grid Computing for Databases

One area of computer technology that can benefit from grid computing is database technology. A grid can support multiple databases and dynamically allocate and reallocate resources as needed to support the current demand for each database. As the demand for a database increases, more resources are allocated for that database, while other resources are deallocated from another database. For example, on an enterprise grid, a database is being serviced by one database server running on one server blade on the grid. The number of users requesting data from the database increases. In response to this increase in the demand for the database, a database server for another database is removed from one server blade and a database server for the database experiencing increased user requests is provisioned to the server blade.

Grid computing for databases can require allocation and management of resources at different levels. At a level corresponding to a single database, the performance and availability of resources provided to the users of the database must be monitored and resources of the database allocated between the users to ensure performance and resource availability goals for each of the users are met. Between databases, the allocation of a grid's resources must be managed to ensure that performance and resource availability goals for users of all the databases are met. The work to manage allocation of resources at these different levels and the information needed to perform such management is very complex. Therefore, there is a need for a mechanism that simplifies and efficiently handles the management of resources in a grid computing system for database systems as well as other types of systems that allocate resources at different levels within a grid.

One such mechanism is the system described in *Hierarchical Management of the Dynamic Allocation of Resources in a*

*Multi-Node System* (50277-2382), which uses a hierarchy of directors to manage resources at different levels. One type of director, a database director, manages resources allocated to a database among users of the database. For example, a grid may host a group of database servers for a database. Each database server in the group is referred to as a database instance. Each database instance hosts a number of database sessions for users and one or more services. The database director manages the allocation of resources available to a database among users and services.

A service is work of a particular type or category that is hosted for the benefit of one or more clients. The work performed as part of a service includes any use or expenditure of computer resources, including, for example, CPU processing time, storing and accessing data in volatile memory, reads and writes from and to persistent storage (i.e. disk space), and use of network or bus bandwidth. A service may be, for example, work that is performed for a particular application on a client of a database server.

For a database, a subset of the group of database instances is allocated to provide a particular service. A database instance allocated to provide the service is referred to herein as hosting the service. A database instance may host more than one service. A service hosted by a database instance of a database is referred to herein as being hosted by the database.

The performance and availability of resources realized by a service hosted by a database may at times not meet requirements for performance and availability of resources. When this situation occurs, another database instance and a node to host the database instance may be allocated within the grid to the database. Often, the only pool of nodes available to allocate to the database are already being used for other databases and services. Allocating the node to the database thus requires de-allocating the node from another database, which impacts the performance and availability of resources realized by the services hosted on the other database.

Based on the foregoing, it is desirable to have an approach that de-allocates a node from a pool of nodes already allocated to a set of databases in a way that accounts for and accommodates the performance and resource availability for the users of services hosted by the set of databases.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for managing the allocation of resources in a multi-node environment is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is an approach for efficiently and dynamically allocating and de-allocating database instances and nodes between databases. The approach performs this function in a way that accounts for the users of and services hosted by multiple databases.

Figure 1:
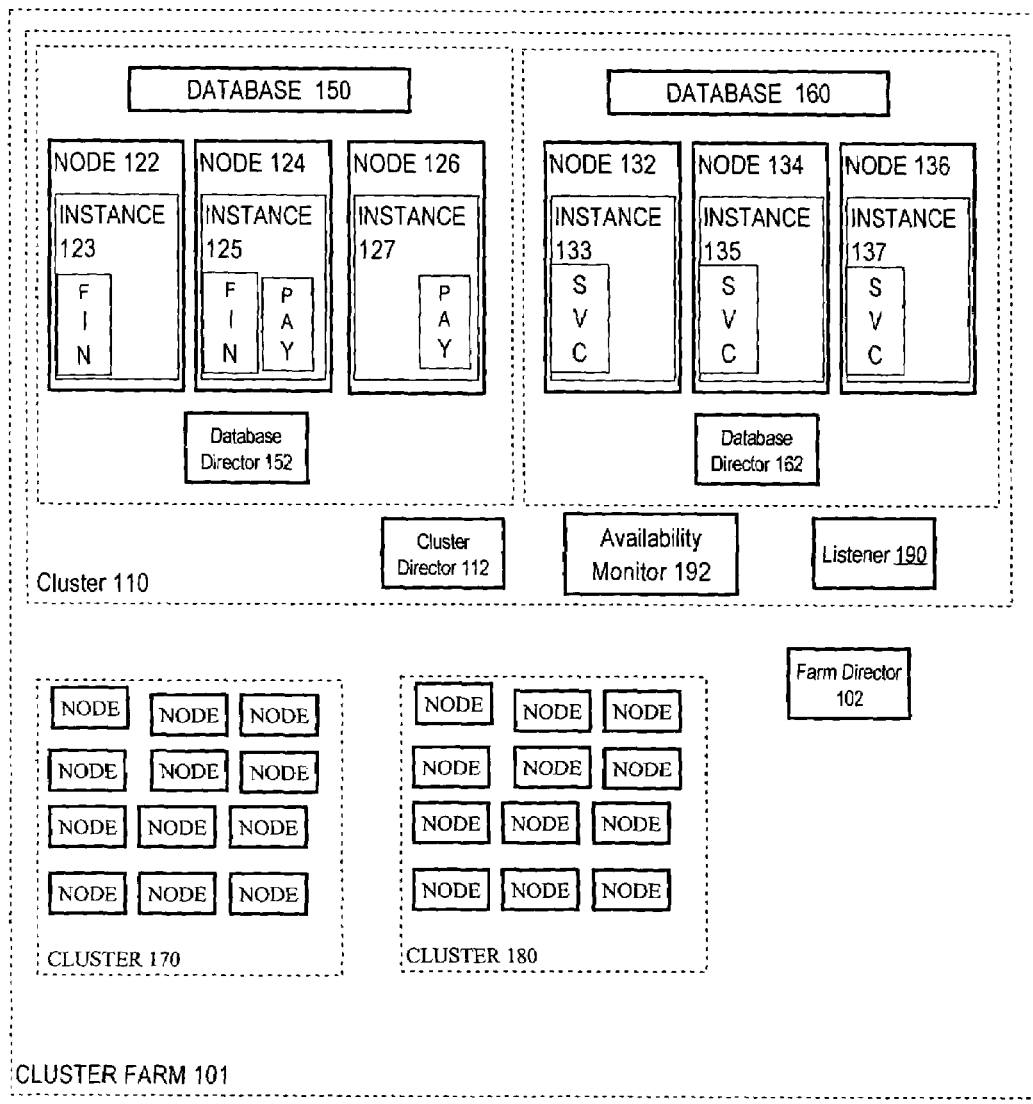
FIG. 1 is a block diagram showing a multi-node computer system on which an embodiment of the present invention may be implemented.

FIG. 1 shows a multi-node computer system that may be used to implement an embodiment of the present invention. Referring to FIG. 1, it shows cluster farm 101. A cluster farm is a set of nodes that is organized into groups of nodes, referred to as clusters. Clusters provide some degree of shared storage (e.g. shared access to a set of disk drives) between the nodes in the cluster. Cluster farm 101 includes clusters 110, 170, and 180. Each of the clusters hosts one or more multi-node database servers that provide and manage access to databases.

The nodes in a cluster farm may be in the form of computers (e.g. work stations, personal computers) interconnected via a network. Alternately, the nodes may be the nodes of a grid. A grid is composed of nodes in the form of server blades interconnected with other server blades on a rack. Each server blade is an inclusive computer system, with processor, memory, network connections, and associated electronics on a single motherboard. Typically, server blades do not include onboard storage (other than volatile memory), and they share storage units (e.g. shared disks) along with a power supply, cooling system, and cabling within a rack.

A defining characteristic of a cluster in a cluster farm is that the cluster's nodes may be automatically transferred between clusters within the farm through software control without the need to physically reconnect the node from one cluster to another. A cluster farm is controlled and managed by software utilities referred to herein as clusterware. Clusterware may be executed to remove a node from a cluster and to provision the node to a cluster. Clusterware provides a command line interface that accepts requests from a human administrator, allowing the administrator to enter commands to provision and remove a node from a cluster. The interfaces may also take the form of Application Program Interfaces ("APIs"), which may be called by other software being executed within the cluster farm. Clusterware uses and maintains metadata that defines the configuration of a cluster within a farm, including cluster configuration metadata, which defines the topology of a cluster in a farm, including which particular nodes are in the cluster. The metadata is modified to reflect changes made to a cluster in a cluster farm by the clusterware. An example of clusterware is software developed by Oracle™, such as Oracle9i Real Application Clusters or Oracle Real Application Clusters 10g. Oracle9i Real Application Clusters is described in Oracle9i RAC: Oracle Real Application Clusters Configuration and Internals, by Mike Ault and Madhu Tumma, 2nd edition (Aug. 2, 2003).

Clusters and Multi-Node Database Servers

Clusters 110, 170, and 180 host one or more multi-node database servers. Cluster 110 hosts a multi-node database server for database 150, the multi-node database server comprising database instances 123, 125, and 127, which are hosted on nodes 122, 124, and 126, respectively. Cluster 110 also hosts a multi-node database server for database 160, the multi-node database server comprising database instances 133, 135, and 137 hosted on nodes 132, 134, and 136, respectively.

A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients. Among other functions of database management, a database server governs and facilitates access to a particular database, processing requests by clients to access the database.

Resources from multiple nodes in a multi-node computer system can be allocated to running a particular server's software. Each combination of the software and allocation of the resources from a node is a server that is referred to herein as a "server instance" or "instance". Thus, a multi-node server comprises multiple server instances that can run on multiple nodes. Several instances of a multi-node server can even run on the same node. A multi-node database server comprises multiple "database instances", each database instance running on a node, and governing and facilitating access to a particular database. Database instances 123, 125, and 127 are instances of the same multi-node database server.

Services

As mentioned before, a service is work of a particular type or category that is hosted for the benefit of one or more clients. One type of service is a database service. Cluster 110 provides a database service for accessing database 150 and a database service for accessing database 160. In general, a database service is work that is performed by a database server for a client, work that typically includes processing queries that require access to a particular database.

Like any service, a database service may be further categorized. Database services for database 150 are further categorized into the FIN service and PAY service. The FIN service is the database service performed by database instances 123 and 125 for the FIN application. Typically, this service involves accessing database objects on database 150 that store database data for FIN applications. The PAY services are database services performed by database instances 125 and 127 for the PAY application. Typically, this service involves accessing database objects on database 150 that store database data for PAY applications.

Sessions

In order for a client to interact with a database server on cluster 110, a session is established for the client. A session, such as a database session, is a particular connection established for a client to a server, such as a database instance, through which the client issues a series of requests (requests for execution of database statements). For each database session established on a database instance, session state data is maintained that reflects the current state of a database session. Such information contains, for example, the identity of the client for which the session is established, and temporary variable values generated by processes executing software within the database session.

A client establishes a database session by transmitting a database connection request to cluster 110. A listener, such as listener 190, receives the database connection request. Listener 190 is a process running on cluster 110 that receives client database connection requests and directs them to a database instance within cluster 110. The client connection requests received are associated with a service (e.g. service FIN and PAY). The client request is directed to a database instance hosting the service, where a database session is established for the client. Listener 190 directs the request to the particular database instance and/or node in a way that is transparent to the client. Listener 190 may be running on any node within cluster 110. Once the database session is established for the client, the client may issue additional requests, which may be in the form of function or remote procedure invocations, and which include requests to begin execution of a transaction, to execute queries, to perform updates and other types of transaction operations, to commit or otherwise terminate a transaction, and to terminate a database session.

Monitoring Workload

Resources are allocated and re-allocated to meet levels of performance and cardinality constraints on the resources. Levels of performance and resource availability established for a particular service are referred to herein as service-level agreements. Levels of performance and cardinality constraints on resources that apply to a multi-node system in general and not necessarily to a particular service are referred to herein as policies. For example, a service-level agreement for service FIN may require as a level of performance that the average transaction time for service FIN be no more than a given threshold, and as an availability requirement that at least two instances host service FIN. A policy may require that the CPU utilization of any node should not exceed 80%.

Policies may also be referred to herein as backend policies because they are used by backend administrators to manage overall system performance and to allocate resources between a set of services when it is deemed there are insufficient resources to meet service-level agreements of all the set of services. For example, a policy assigns a higher priority to a database relative to another database. When there are insufficient resources to meet service-level agreements of services of both databases, the database with the higher priority, and the services that use the database, will be favored when allocating resources.

To meet service-level agreements, a mechanism is needed to monitor and measure workload placed on various resources. These measures of workload are used to determine whether service-level agreements are being met and to adjust the allocation of resources as needed to meet the service-level agreements.

According to an embodiment of the present invention, a workload monitor is hosted on each database instance and generates "performance metrics". Performance metrics is data that indicates the level of performance for one or more resources or services based on performance measures. Approaches for performing these functions are described in *Measuring Workload by Service* (50277-2337). The information generated is accessible by various components within multi-node database server 222 that are responsible for managing the allocation of resources to meet service-level agreements, as shall be described in greater detail later.

A performance metric of a particular type that can be used to gauge a characteristic or condition that indicates a level of performance or workload is referred to herein as a performance measure. A performance measure includes for example, transaction execution time or percent of CPU utilization. In general, service-level agreements that involve levels of performance can be defined by thresholds and criteria that are based on performance measures.

For example, execution time of a transaction is a performance measure. A service-level agreement based on this measure is that a transaction for service FIN should execute within 300 milliseconds. Yet another performance measure is percentage CPU utilization of a node. A backend policy based on this measure is that a node experience no more than 80% utilization.

Performance metrics can indicate the performance of a cluster, the performance of a service running on a cluster, a node in the cluster, or a particular database instance. A performance metric or measure particular to a service is referred to herein as a service performance metric or measure. For example, a service performance measure for service FIN is the transaction time for transactions executed for service FIN.

According to an embodiment, service-level agreements and backend policies are based on the following.

Service or Database Cardinality A service-level agreement or backend policy can restrict the number of resources that can be allocated for a particular use. Such constraints are referred as a cardinality constraint. A service cardinality constraint requires that a minimum and/or maximum number of database instances host a service; a database cardinality constraint requires that a minimum and/or maximum number of database instances for a database be running. Cardinality constraints can also limit the number of nodes in a cluster.

Service or Database Priority Some services or databases may be designated as having a higher priority than others. Preference is given to higher priority services or databases when allocating resources, particularly when there are insufficient resources to meet service-level agreements of all of a set of services or databases. Priority information may be supplied by database administrators.

$N_{cpu}$ Percent CPU utilization of a node. Percent CPU utilization may be calculated by summing the percent CPU utilization of services hosted on a database instance residing on a node.

$X_{cpu}$ A policy in the form of a threshold CPU utilization for a node. For purposes of illustration, $X_{cpu}$ is constant for all nodes in a cluster. However, it may be variable, depending on various factors, such as the number of database instances running for a database.

$CPU_{aval}$ This is the available unused CPU utilization on a node, which is defined as the difference between $X_{cpu}$ and $N_{cpu}$ (i.e. $X_{cpu}-N_{cpu}$)

Availability Availability is a subcategory of cardinality in that it is the minimum number of resources that should be available for a particular use. For example, a service availability requirement requires that a service be hosted by at least a minimum number of database instances.

Availability is monitored by daemon processes referred to as availability monitors. Availability monitors, such as availability monitor 192, are daemons that detect when a node or database instance becomes unavailable due to an unavailability event, such as a system crash. When detecting that a node or database instance has become unavailable, an availability monitor informs a database director and/or cluster director of the affected services and nodes. The directors initiate actions to achieve compliance to availability requirements. For example, an availability requirement requires that PAY be hosted on at least two database instances. Availability monitor 192 detects that instance 125 has gone down and informs database director 152. In response, database director 152 initiates service expansion to expand service PAY to a second running database instance, database instance 123.

Hierarchy of Directors

A hierarchy of directors, such as that described in *Hierarchical Management of the Dynamic Allocation of Resources in a Multi-Node System* (50277-2382), is used to dynamically adjust the allocation of resources within cluster farm 101 to meet service-level agreements. Cluster farm 101 includes a database director for each database managed by a database server on cluster farm 101, a cluster director for each cluster within cluster farm 101, and a farm director for cluster farm 101.

A database director, such as database director 152 and 162, dynamically manages and adjusts the allocation of resources of a database between services hosted by the database instances of the database. One measure a database director uses to perform this responsibility is to perform incremental runtime session balancing between the database instances of a database as described in *Incremental Run-Time Session Balancing in a Multi-Node System* (50277-2411). Incremental runtime session balancing migrates the database sessions of a service between databases instances hosting the service. Another measure that can be undertaken by a database director is service expansion. Under service expansion, another database instance is allocated to host a service, as described in *Service Placement for Enforcing Performance and Availability Levels in a Multi-Node System* (50277-2412).

A cluster director, such as cluster director 112, manages and adjusts allocation of resources between databases. One measure a cluster director undertakes to perform this responsibility is to add or remove a database instance for a database to or from an existing node within a cluster, as described herein in greater detail.

A farm director, such as farm director 102, manages and adjusts allocation of resources between clusters. One measure a farm director undertakes to perform this responsibility is to add or remove a node to or from a cluster.

The directors detect violations of service-level agreements, herein referred to as service-level violations. For example, database director 152 periodically analyzes performance metrics and determines that the average transaction time for FIN on instance 125 violates the service-level agreement for this measure or determines that the percent CPU utilization on node 124 for service FIN violates the policy for CPU utilization.

Escalating Remedies to Resolve Violations of Service-Level Agreements

According to an embodiment, a database director remedies a service-level violation it detects by initially making adjustments to resource allocations that are less disruptive and costly before resorting to more disruptive and costly resource allocations. Migrating database sessions of a service between the database instances of a database that are hosting the service is in general less disruptive and costly than expanding the service to another database instance; expanding a service to another database is in general less disruptive and costly than provisioning a database instance to another node or adding another node to a cluster.

Figure 2:
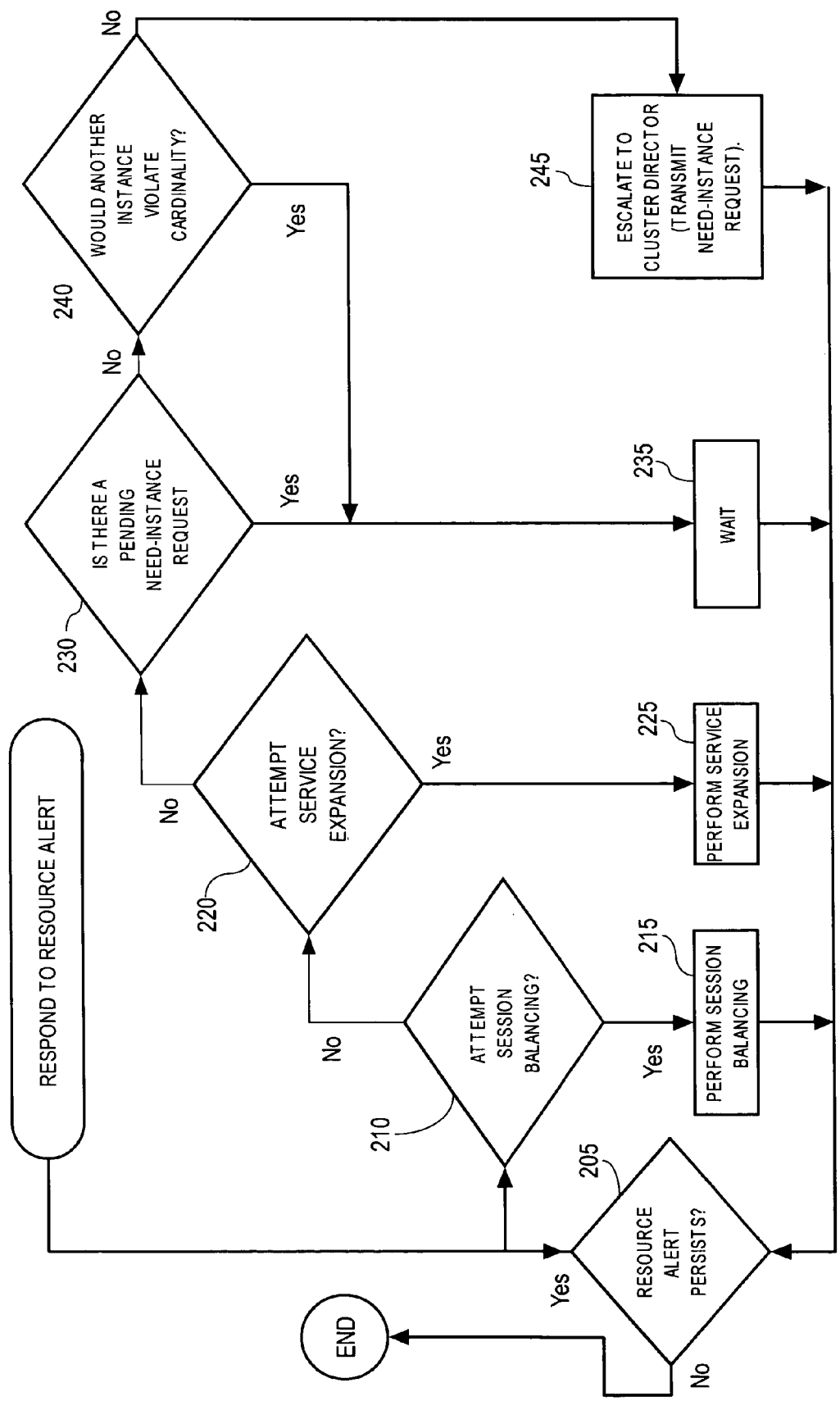
FIG. 2 is a flow chart showing a procedure managing the escalation of remedies employed to resolve violations of service-level agreements.

FIG. 2 shows a procedure that may be used to manage the escalation of remedies employed to resolve service-level violations. The procedure is initiated by a database director in response to detecting a resource alert for a service on a "source" database instance of a "source" database. A resource alert is the detection of a condition or event that triggers attention to resource allocation within a multi-node computer system. Resource alerts include, in particular, detection of service-level violations. For example, a resource alert can be detecting that the average transaction time for service FIN on source database instance 125 exceeds the service-level agreement for this measure.

Referring to FIG. 2, at step 210, the database director first determines whether to attempt run-time session balancing. This determination is made by determining whether there are any candidate services on the source database instance for which session balancing can be performed. If it is determined that session balancing should be performed, then at step 215 session balancing is performed, such as that described in *Incremental Run-Time Session Balancing In A Multi-Node System* (50277-2411).

At step 205, a determination is made of whether the resource alert persists. If a remedy invoked in an iteration of the procedure, such as session balancing at step 215, resolves the root cause of the resource alert, then the resource alert may no longer persist. Execution of the procedure ends.

If, however, the resource alert persists, another iteration of the procedure is performed to undertake another remedy. Step 205 is performed after each iteration to assess whether a remedy taken in the iteration has resolved the resource alert or whether another iteration of the procedure should be performed.

If, at step 210, the determination is that run-time session balancing should not be attempted, then the procedure determines at step 220 whether service expansion should be attempted. This determination is made by determining whether there are any candidate services on a source database instance that can be expanded, as explained in greater detail in *Service Placement for Enforcing Performance and Availability Levels in a Multi-Node System* (50277-2412). If the determination is that service expansion should be performed, then at step 225, service expansion is performed, and the procedure returns to step 205.

If the determination is that service expansion cannot be performed, then the database director determines whether the resolution of the resource alert should be escalated to the cluster director to implement more costly remedies, such as allocating another database instance for the database, and if needed, adding a node to the cluster.

At step 230, the database director determines whether there is a pending "NEED-INSTANCE" request being processed for the database director by the cluster director. A NEED-INSTANCE request is a request for another database instance on another node. A pending NEED-INSTANCE request is a NEED-INSTANCE request that is currently being processed by, for example, the cluster director. Such processing can include (as described in later detail) finding a node for a database instance or removing a database instance from a node so that another database instance may be provisioned to the node. If there is a pending NEED-INSTANCE request, then at step 235 the database director waits and then proceeds to step 205. If the resource alert persists, then the database director performs a subsequent iteration. A new database instance may have been allocated to the database as a result of the pending NEED-INSTANCE request. In the subsequent iteration, the database director may expand a service to the newly allocated database instance and alleviate or remedy the resource alert.

If the determination at step 230 is that there is no pending NEED-INSTANCE request being processed for the database director by the cluster director, then at step 240 the database director determines whether allocating another database instance would violate a maximum cardinality for the database. If the database director determines that adding another database instance would violate the maximum cardinality for the database, then execution proceeds to step 235, where the database director waits until proceeding to possibly perform another iteration of the procedure shown in FIG. 2.

If at step 240, the database director determines that adding another database instance would not violate a maximum cardinality for the database, then at step 245 the database director escalates resolution of the resource alert to the cluster director by transmitting a NEED-INSTANCE request.

While performing the various steps in the procedure, the database director delegates various actions to an asynchronous job and then waits for the results of various actions performed by the job. For example, the database director may be waiting for the result of an asynchronous job it issued to expand a service (see *Service Placement for Enforcing Performance and Availability Levels in a Multi-Node System* (50277-2412)) or to migrate sessions (see *Incremental Run-Time Session Balancing in a Multi-Node System* (50277-2411)). In addition, the database director may wait for the result of a NEED-INSTANCE request issued to a cluster director. While waiting in these cases, the database director does not in fact lay idle. Instead, it concurrently processes other resource alerts by performing the procedure depicted in FIG. 2.

When processing another resource alert for another service, the database director at step 230 may determine that the pending NEED-INSTANCE request is pending. The pending NEED-INSTANCE request may have been requested by the database director for another resource alert in a previous iteration.

Initiating Allocation of Database Instance and Node to a Database

Figure 3:
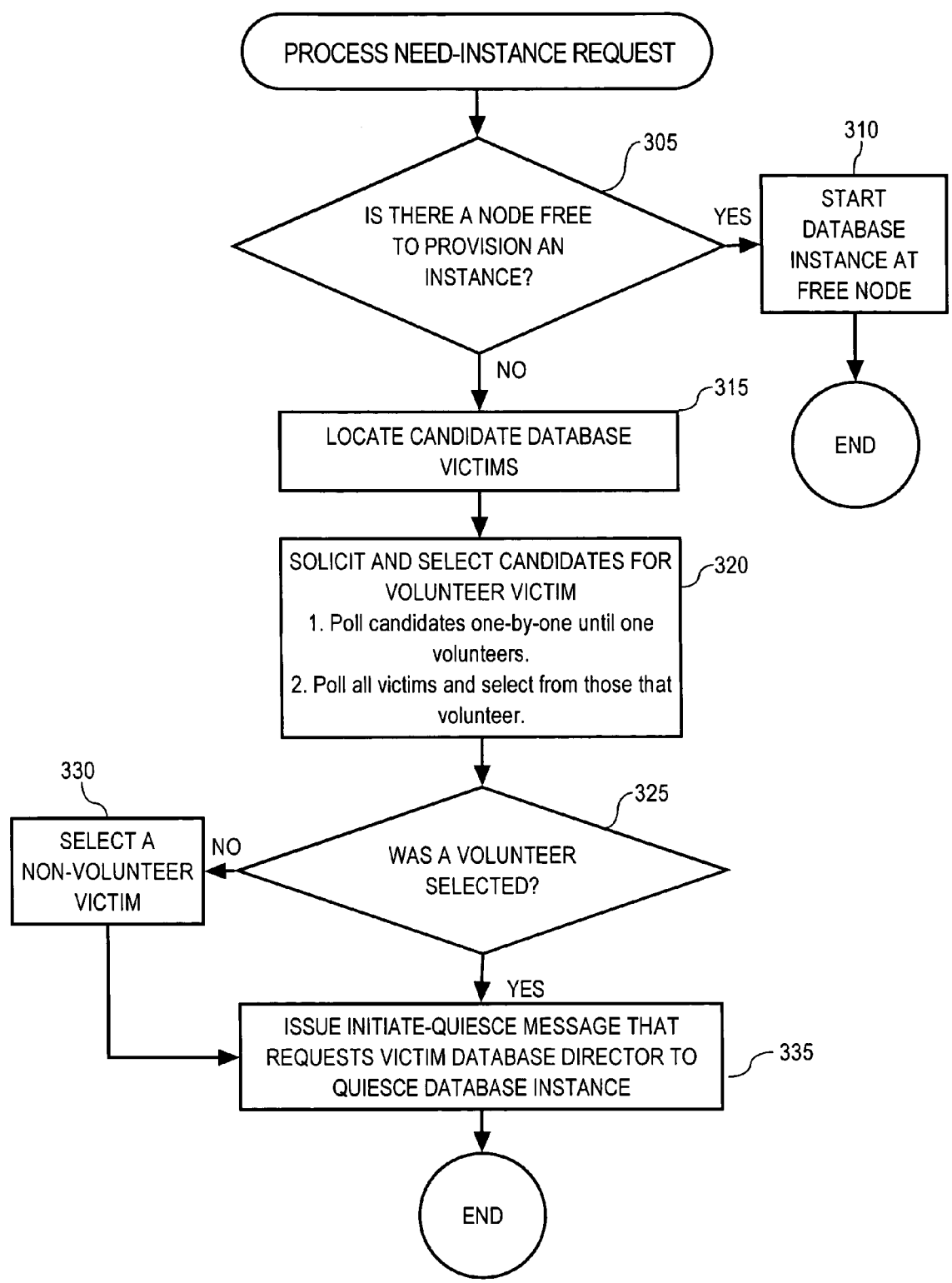
FIG. 3 is a flow chart showing a procedure for responding to a request to get another database instance for a database according to an embodiment of the present invention.

FIG. 3 shows a procedure followed by a cluster director to initiate allocation of a node to a database in response to processing a NEED-INSTANCE request made by a "requesting database director."

Referring to FIG. 3, at step 305, the cluster director determines whether there is a free node, within the cluster the cluster director is responsible for, to which an instance may be provisioned. In an embodiment, a node is free if a database instance does not reside on the node, and the cluster director is not in the process of allocating the node to another database instance (e.g. allocating a node in response to a NEED-INSTANCE request generated for another database), or the node is reserved for some other purpose by the clusterware. The cluster director may invoke an API of the clusterware to determine what nodes are in the cluster and whether any database instance resides on them or has been reserved for some other purpose by the clusterware.

If, at step 305, the cluster director determines that a node is free, then, at step 310, the cluster director invokes an API function of the clusterware to start a database instance for the database on the free node. Next, the cluster director sends a message to the requesting database director informing the database director that a database instance for the database has been provisioned to the node.

If, at step 305, the cluster director determines that a node is not free, then the cluster director attempts to obtain a node that is allocated to another database ("database victim") within the cluster.

At step 315, the cluster director locates database victim candidates. According to an embodiment of the present invention, the cluster director generates an ordered list of databases nested within the cluster, referred to as the victim candidate list, which is ordered according to database priority. Databases with lower priority are located at the beginning of the list while those with higher priority are located at the end of the list.

The locating of database victim candidates can be performed by invoking a function. The function returns one or more candidate victims according to a policy implemented in the function. The functions could implement a variety of approaches and policies for determining a list of database victim candidates. Furthermore, such a function could be user-supplied, that is, could be a function that is not part of the native software of a database server but is registered with a database server to be invoked for the purpose of determining a list of database candidate victims.

At step 320, the cluster director solicits the database directors of the victim list for a volunteer to quiesce a database instance and selects a volunteer from among the one or more database directors who volunteered.

The term quiesce refers to disabling a use of a server by a set of clients of the server. Quiescing a database instance of a database refers to disabling the use of the database instance by clients to access to the database. Quiescing a service refers to disabling the use of a database instance for that service. As described in greater detail, quiescing a database instance can entail preventing new connections to the database instance and transferring work being performed for clients to another database instance via, for example, session migration.

Step 320 may be accomplished in various ways.

The cluster director may poll the database directors of the candidates in the victim candidate list one-by-one in order. To poll a database director of a candidate, the cluster director transmits a "QUIESCE-VOLUNTEER" request to the database director, which responds by transmitting a message specifying whether the database director volunteers to quiesce. If the polled candidate volunteers, the cluster director selects the candidate as the victim.

Alternately, the cluster director broadcasts the quiesce requests to all the database directors of the candidates in the victim candidate list. Then, the cluster director selects a victim database among those whose director volunteered, i.e. transmitted a message specifying that the database director volunteers.

The messages transmitted by the volunteering database directors may include data indicating a quiescing cost, as explained later in greater detail. Quiescing cost is the amount of work needed to quiesce a database instance.

The selection of a victim database can be based on a database priority, quiescing cost, or a combination of these factors. For example, the cluster director can select a database associated with the lowest quiescing cost or the lowest database priority. If selecting based on database priority, and multiple databases have the lowest priority, then the cluster director selects from among the multiple databases the one associated with the lowest quiescing cost.

At step 325, a determination is made of whether a victim was selected. If no victim was selected, then at step 330, a victim database is selected by choosing a lowest priority database from the candidate victim list that has at least two database instances. Execution proceeds to step 335.

At step 335, the cluster director issues an asynchronous job. The job transmits to the victim's database director a "QUIESCE-INITIATE" request to request that the database director quiesce a database instance.

Execution of the steps in FIG. 3 ends.

Subsequently, the cluster director receives an "IDLE-INSTANCE" message from the victim's database director, to which the cluster director responds by shutting down the quiesced instance. Meanwhile, the cluster director processes other requests, including other NEED-INSTANCE requests.

Responding to Idle-Instance Message

Figure 4:
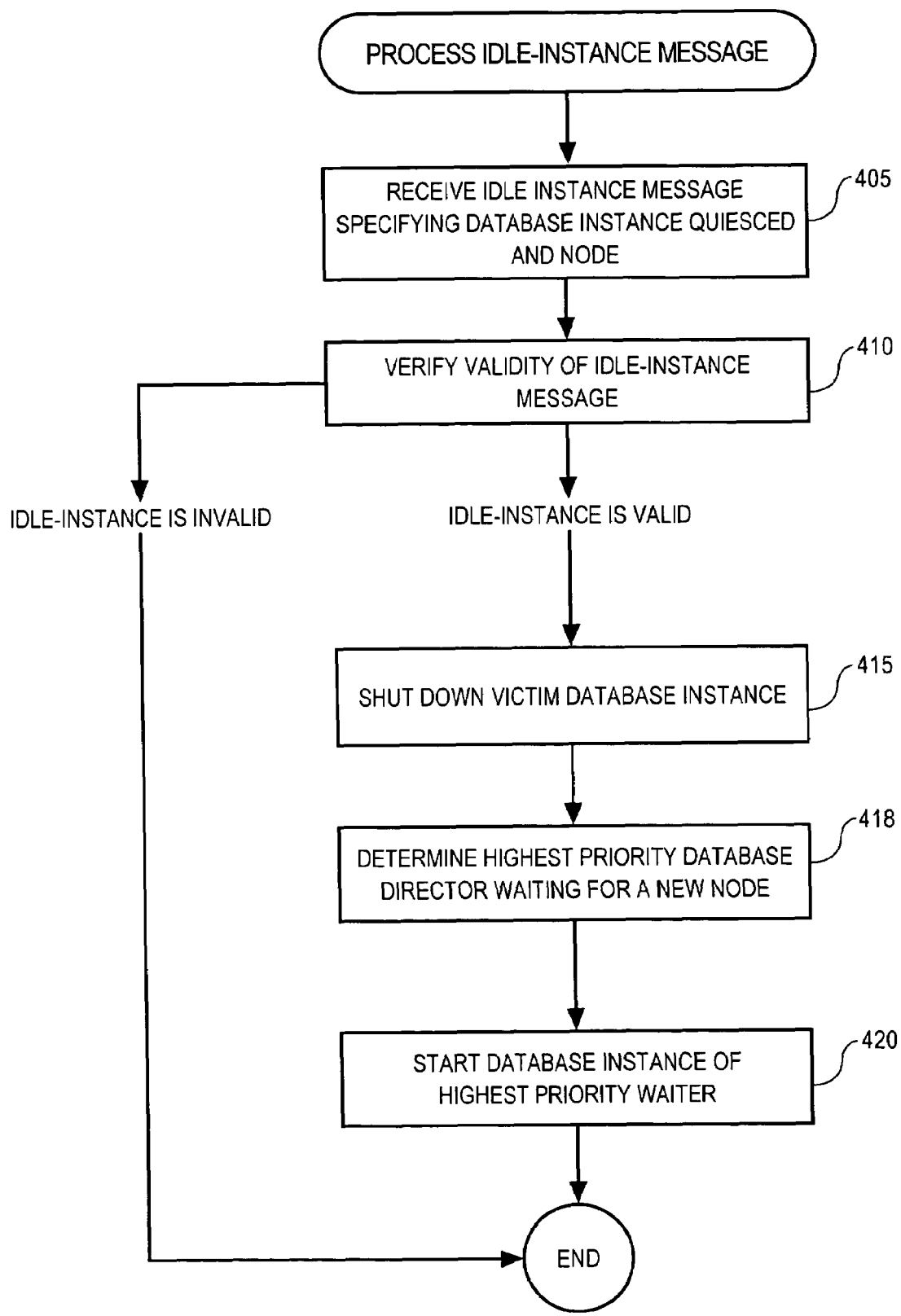
FIG. 4 is a flow chart showing a procedure for shutting down and bringing up another database instance on a node according to an embodiment of the present invention.

FIG. 4 shows a procedure followed by the cluster director to respond to an IDLE-INSTANCE request according to an embodiment of the present invention. At step 405, the cluster director receives an IDLE-INSTANCE message. The IDLE-INSTANCE message includes the identity of the "victim database instance" quiesced by the victim's database director and the node on which the victim database instance is hosted.

At step 410, the cluster director verifies the validity of the IDLE-INSTANCE message, that is, verifies that the victim database is running and can be shut down. It is possible that after the victim database director has quiesced a victim database instance, that the victim database instance was shut down (i.e. made not to run anymore) and another database instance was started to respond to, for example, a high availability event. In this case, the cluster director does not shut down the other database instance. To determine the identity of the database instance running on the node on which the victim database instance quiesced, the cluster director invokes an API of the clusterware. If that identity is the same as that of the victim database instance's, the IDLE-INSTANCE message is valid and execution proceeds to step 415. Otherwise, execution of the steps ends.

At step 415, the cluster director shuts down the victim database instance. At step 418, the cluster director determines the highest priority database director waiting for a new node (i.e. the highest priority database whose director is waiting for a new node). At step 420, the cluster director starts the requested database instance for the highest priority waiting database, which may be different from the database that originally submitted the NEED-INSTANCE message to the cluster director. This procedure allows higher priority requests that arrive later to pre-empt a lower priority request that may have initiated the quiesce of an instance. Both steps 415 and 420 are performed by invoking APIs of the clusterware.

Responding to QUIESCE-VOLUNTEER Request

Figure 5:
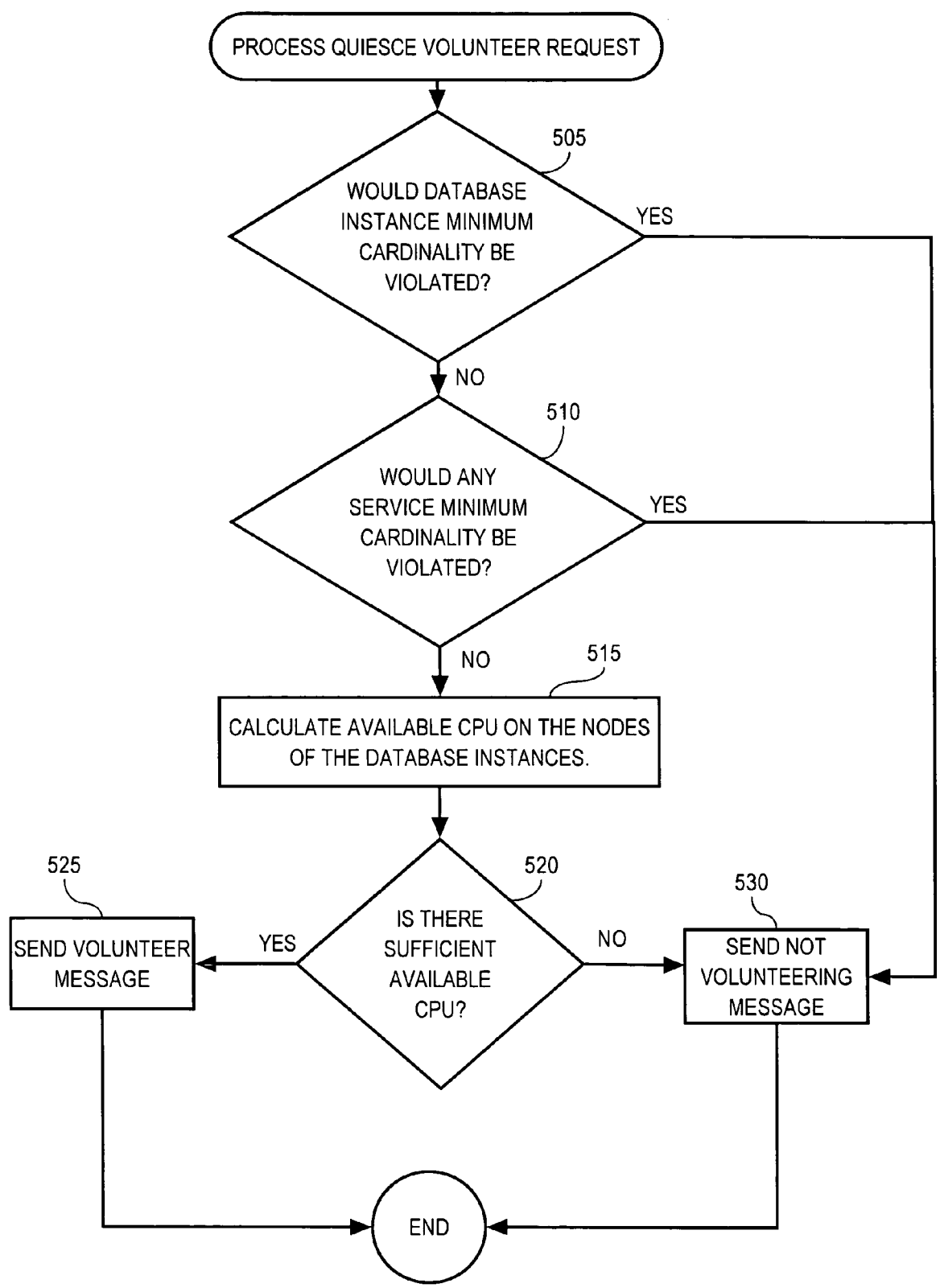
FIG. 5 is a flow chart depicting a procedure for determining whether to volunteer a database instance for quiescing according to an embodiment of the present invention.

FIG. 5 shows a procedure for determining whether a database director may volunteer to quiesce a database instance for the database of the database director. The procedure is performed in response to a "QUIESCE-VOLUNTEER" request sent by a "requesting cluster director."

Referring to FIG. 5, at step 505, the database director determines whether the minimum database cardinality constraint for the database would be violated by allocating one less database instance for the database. It is possible that the database director may be in the process of quiescing another database instance. If so, the database director determines whether the minimum database cardinality constraint would be violated by allocating one less database instance plus any database instance that may be in the process of being quiesced. If the database director determines that the minimum database cardinality constraint would be violated, then execution proceeds to step 530, where the database director sends a message to the requesting cluster director specifying that the database director is not volunteering to quiesce a database instance. Otherwise, if the database director determines that the minimum database cardinality constraint would not be violated, then execution proceeds to step 510.

At step 510, the database director determines whether the minimum service cardinality of any of the services hosted on the database would be violated by allocating one less database instance for the database. The minimum cardinality of instances of a database that there can be without violating the service cardinality constraint of any of the services hosted on the database is the largest minimum service cardinality of any of the services hosted on the database. For example, among the databases hosted on database 150, the minimum cardinality constraint for service FIN and PAY is 1 and 2, respectively. The largest minimum cardinality constraint of any the hosted services is therefore 2. There are three database instances for database 150. Removing a database instance for database 150 leaves 2, and therefore no minimum service cardinality is violated, and execution proceeds to step 515. If, on the other hand, the minimum cardinality constraint for service PAY is 3, then the largest minimum service cardinality of any of the services is 3, and removing a database instance for database 150 violates a minimum service cardinality of at least one service hosted on database 150, and execution proceeds to step 530, where the database director sends a message to the requesting cluster director specifying that database director is not volunteering to quiesce.

At step 515, the total available CPU utilization is calculated for the nodes hosting the database, i.e. the nodes hosting the database instances of the database. According to an embodiment, this is determined by summing the $CPU_{aval}$ of each of the nodes hosting the database. The total available CPU utilization is an indication of the ability of the set of nodes hosting a database to handle their current workload with one less node. For example, $CPU_{aval}$ for nodes 122, and 124, and 126 is greater than 80 percent. If the total available CPU utilization is greater than $X_{cpu}$, then there is enough total available CPU utilization to handle the workload with one less node without violating the threshold.

At step 520, it is determined whether there is sufficient total available CPU utilization available. If total available CPU utilization is greater than $X_{cpu}$ plus a factor of $X_{cpu}$, then there is sufficient total available CPU utilization available.

The total available CPU utilization calculated is only an estimate of the ability of the nodes hosting a database to handle current workload with one less node without violating service-level agreements and policies for CPU utilization. Because this estimate may not be accurate, the factor is added to $X_{cpu}$ to avoid overloading the remaining nodes. The factor could be, for example, 5% of $X_{cpu}$.

If, at step 520, it is determined that there is not sufficient total available CPU utilization available, then execution proceeds to step 530, where the database director sends a message specifying that it is not volunteering. Otherwise, at step 525, the database director sends a message acknowledging that it is volunteering.

A message acknowledging that the database director is volunteering can also contain data indicating the cost of quiescing a database instance for the database. Such data includes the minimum number of database sessions on any database instance, the minimum percent CPU utilization of any node hosting the database, and/or the total available CPU utilization for the database. Generally, a higher number of database sessions on a database instance indicates a higher cost of quiescing the instance. A higher total available CPU utilization indicates a lower cost of quiescing the instance. A lower CPU utilization on a node indicates a lower cost of quiescing a database instance.

Execution of the procedure of FIG. 5 ends.

Processing Quiesce-Initiate Request

Figure 6:
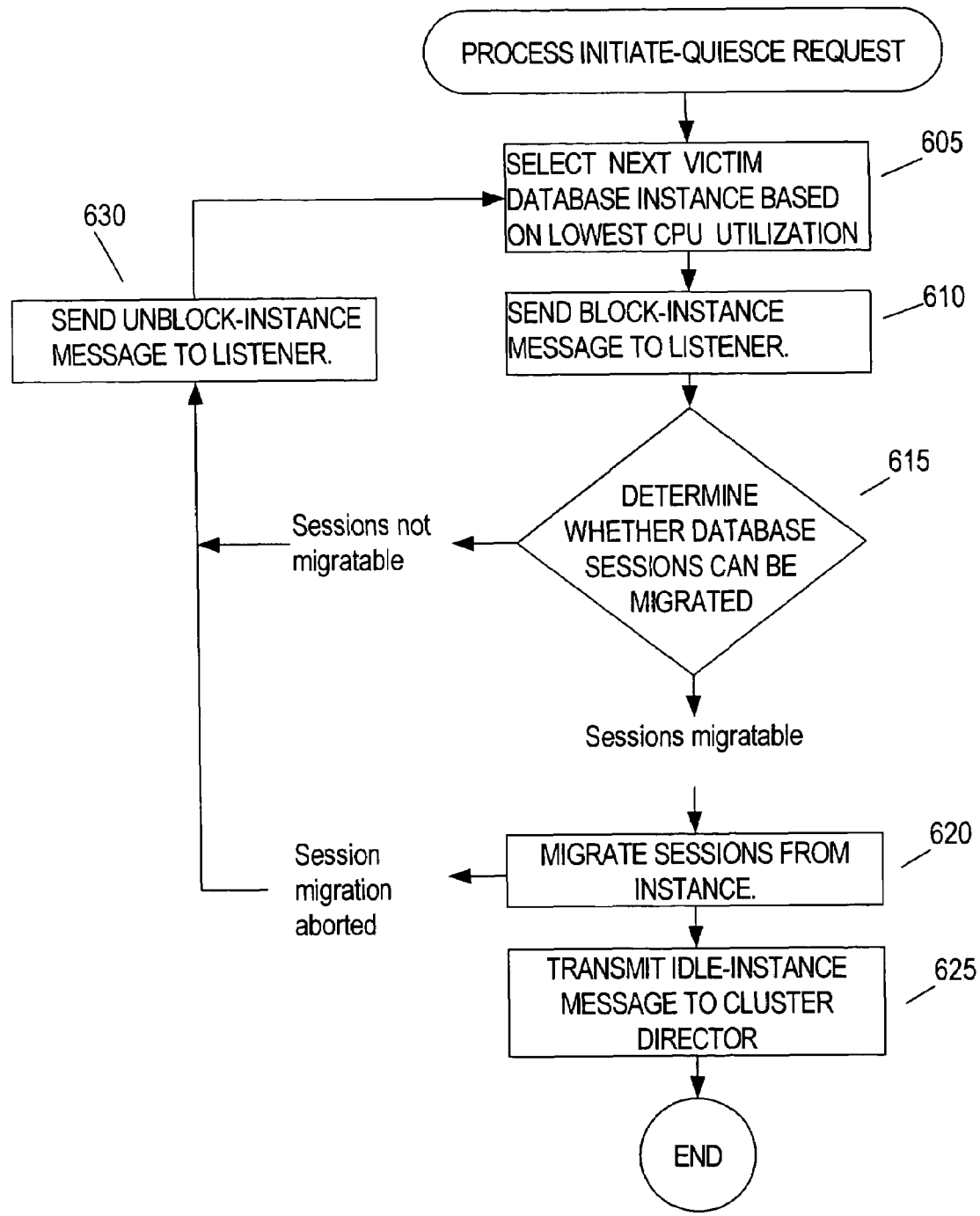
FIG. 6 is a flow chart depicting a procedure used for quiescing a database instance according to an embodiment of the present invention.

FIG. 6 shows a procedure performed by a database director for a database to select and quiesce a database instance from among database instances of the database. The procedure is performed by the database director in response to a QUIESCE-INITIATE request sent by a cluster director to quiesce a database instance.

Referring to FIG. 6, at step 605, the database director selects a database instance as a candidate victim, making the selection in an order based on percent CPU utilization. A database instance with lower CPU utilization is selected before one with higher CPU utilization.

At step 610, the database director sends a "BLOCK-INSTANCE" message to the candidate victim's listener. The message instructs the listener to stop directing database connection requests to the selected candidate. Accordingly, the listener directs database connection requests for any service to another database instance hosting the service.

At step 615, the database director determines whether the database sessions are migratable, i.e., whether the database sessions can be migrated to another database instance. For example, a database session may not be migratable when the session state includes a file descriptor of an open file. The file descriptor contains information that is only valid for a session on the source instance but not the destination instance. Other ways of determining whether the database sessions can be migrated are described in *Transparent Session Migration Across Servers* (50277-2383). If the sessions are not migratable, an "UNBLOCK-INSTANCE" message is sent to the listener at step 630, informing the listener that it may direct connection requests to the candidate victim. Another candidate victim is selected at step 605.

If the sessions can be migrated, then execution proceeds to step 620. At this stage the candidate victim becomes the victim.

At step 620, the sessions are migrated from the victim to the other database instances of the database. The sessions may be migrated in a way similar to that described in *Incremental Run-Time Session Balancing in a Multi-Node System* (50277-2411). As described therein, sessions are migrated to other database instances in response to a resource alert caused by a service-level violation. Sessions on the database instance for a service are migrated to other database instances until the resource alert no longer persists.

A similar procedure may be used for step 620. Database sessions are migrated to database instances other than the victim. The resource alert, rather than applying to one service, applies to all services on the victim, and persists until all the database sessions are migrated from the victim for all services hosted by the victim, or until the database director decides to abort its attempt to migrate database sessions. In the latter case, execution proceeds to step 630, where the database director sends an UNBLOCK-INSTANCE message to the listener. The procedure in FIG. 6 is performed again, except that the victim is not selected as a victim again. Finally, while the session migration from the victim is being performed, all attempts to migrate sessions to the victim are prevented.

At step 625, the database director sends the cluster director an IDLE-INSTANCE message.

It is possible that all instances of the victim database have unmigratable database sessions. In this case, the database director selects an instance as a victim and migrates the migratable database sessions. With respect to the unmigratable database sessions, the database director waits until they terminate or become migratable and are migrated, or the they may be forcibly terminated based on a policy specified by the administrator and/or priority for the service for which the new node is required.

Examples of Alternate Embodiments

An embodiment of the present invention has been illustrated by dynamically allocating the resources of a multi-node system among database services and subcategories of database services. However, the present invention is not so limited.

For example, an embodiment of the present invention may be used to allocate computer resources of a multi-node system that hosts an application server among services provided by the application server. An application server is part of, for example, a three tier architecture in which an application server sits between clients and a database server. The application server is used primarily for storing, providing access to, and executing application code, while a database server is used primarily for storing and providing access to a database for the application server. The application server transmits requests for data to the database server. The requests may be generated by an application server in response to executing the application code stored on the application server. An example of an application server is Oracle 9i Application Server or Oracle 10g Application Server. Similar to examples of a multi-node server described herein, an application server may be distributed as multiple server instances executing on multiple nodes, the server instances hosting multiple sessions that may be migrated between the server instances.

The present invention is also not limited to homogenous multi-node servers comprised only of server instances that execute copies of the same software product or same version of a software product. For example, a multi-node database server may be comprised of several groups of server instances, each group executing a different database server software from a different vendor, or executing a different version of database server software from the same vendor.

Hardware Overview

Figure 7:
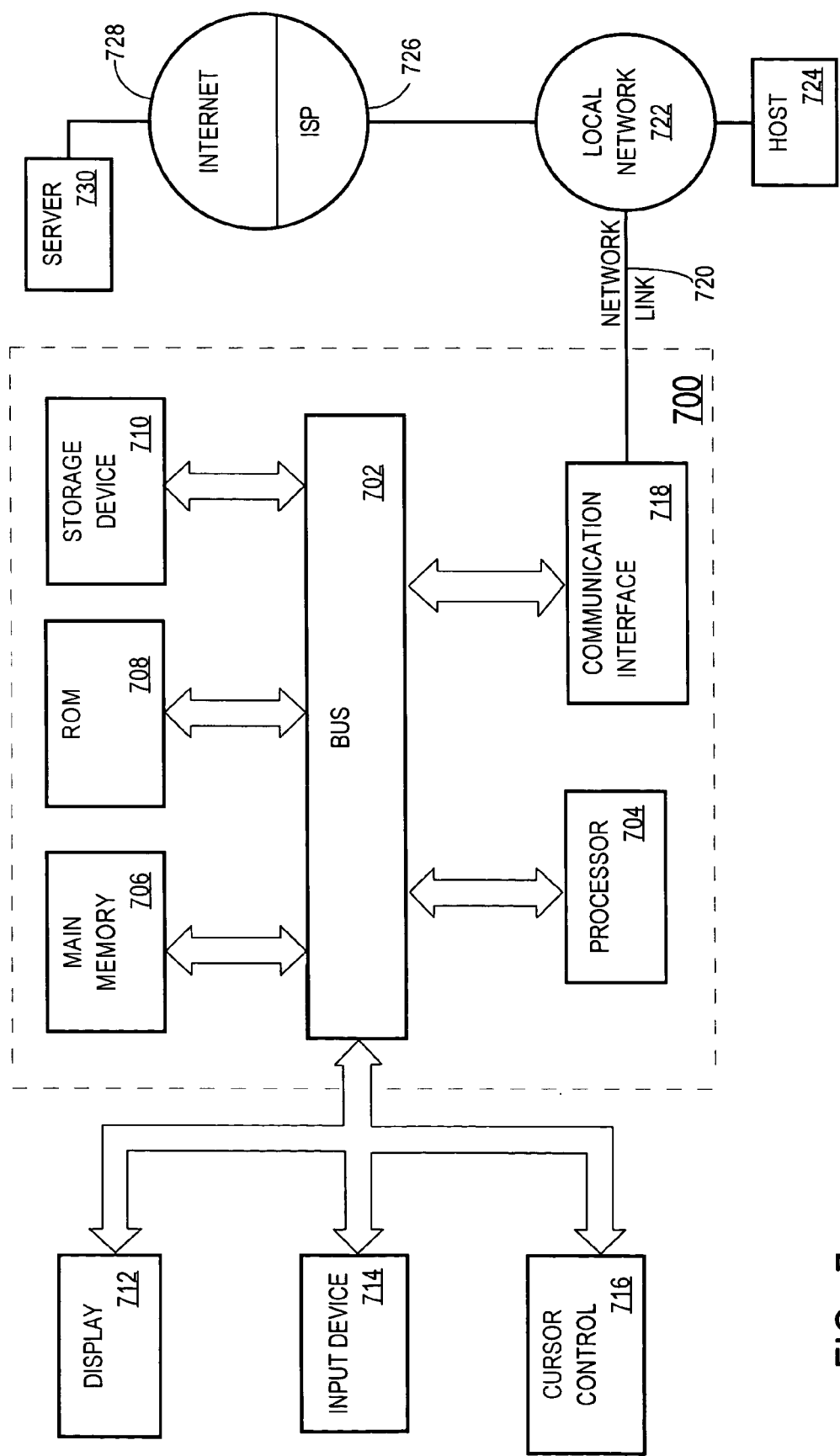
FIG. 7 is a block diagram of a computer system that may be used in an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing resources in a multiple node system, the method comprising the steps of:
   said multiple node system detecting a violation of a service-level agreement on a multi-node server, wherein said multi-node server includes a set of server instances that runs a first set of nodes, wherein a server comprises integrated software components executed by at least one process running on a node, wherein each node of said multiple node system is a computing element interconnected to at least another node of said multiple node system;
   in response to detecting said violation, said multiple node system determining whether to resolve said violation by using a node that is not a member of said first set of nodes to host another server instance of said multi-node server; and
   in response to determining to resolve said violation by using a node that is not a member of said first set of nodes, attempting to resolve said violation by performing steps that include:
      said multiple node system finding another node to use to host a second server instance of said multi-node server, and
      said multiple node system starting said second server instance of said multi-node server on said other node without rebooting said another node.

2. The method of claim 1, wherein:
   after finding said other node and before starting said second server instance, said node hosts a third server instance; and
   the step of attempting to resolve said violation further includes shutting down said third server instance before starting said server instance.

3. The method of claim 2, wherein the step of attempting to resolve said violation includes:
   transmitting a request to a second multi-node server to prepare a server instance to shut down; and
   receiving a message from the second multi-node server indicating that a server instance is prepared to shut down.

4. The method of claim 3, wherein:
   the message indicating a server instance is prepared further includes data identifying the second server instance and node.

5. The method of claim 1, wherein the step of finding another node further includes:
   generating a set of candidates that correspond to another multi-node server hosted by another set of nodes different than said first set of nodes; and
   selecting a victim from said set of candidates from which to deallocate a node.

6. The method of claim 5, wherein:
   the steps further include transmitting a request to a multi-node server corresponding to a candidate of said set of candidates to volunteer to quiesce a server instance on a node; and
   selecting a victim includes selecting a victim from a candidate of a plurality of multi-node servers that transmit, in response to said request to quiesce, a message to volunteer to quiesce.

7. The method of claim 6, wherein the step of transmitting a request to a multi-node server includes broadcasting the request to the set of candidates.

8. The method of claim 6, wherein the step of selecting a victim from a candidate of a plurality of multi-node servers includes selecting a victim based on one or more factors that include at least one of:
   priority data that is supplied by a user and that indicates a priority of a candidate of said plurality of multi-node servers relative to other candidates of said plurality of multi-node servers; and
   a quiescing cost associated with quiescing a server instance on a node.

9. A method used for managing resources in a multiple node system, the method comprising the steps of:
   a first multi-node server running on a plurality of nodes of said multiple node system, said first multi-node server comprising a plurality of server instances running on said plurality of nodes;
   said first multi-node server receiving a request to acknowledge whether at least one server instance may be relinquished;
   in response to receiving said request, said first multi-node server determining whether using at least one less server instance causes a service-level violation; and
   if said first multi-node server determines that at least one server instance does not cause a service-level violation, then transmitting a message indicating that at least one server instance of a plurality of server instances may be relinquished.

10. The method of claim 9, wherein determining whether using at least one less server instance causes a service-level violation includes determining whether a service-level agreement for a type of work performed by said first multi-node server would be violated.

11. The method of claim 10, wherein the service-level agreement for a type of work performed is based on a cardinality of server instances allocated to that type of work.

12. The method of claim 9, wherein determining whether using at least one less server instance causes a service-level violation includes determining whether there is sufficient available unused CPU utilization to absorb workload of the plurality of nodes with at least one less node.

13. The method of claim 9, wherein:
   said multiple node system includes a plurality of other multi-node servers including a second multi-node server;
   a priority is associated with said plurality of other multi-node servers;
   a request for another server-instance for said second multi-node server causes transmitting the request to acknowledge whether at least one server instance may be relinquished;
   the steps further include, in response to receiving said message indicating that at least one server instance may be relinquished, allocating said at least one server instance to a multi-node server associated with a higher level of said priority; and
   said multi-node server associated with a higher level of said priority is either said second multi-node server or a different multi-node server of said plurality of other multi-node servers.

14. A computer-readable storage medium carrying one or more sequences of instructions for managing resources in a multiple node system, which instructions, when executed by one or more processors, cause the one or more processors to carry out the steps of:
   said multiple node system detecting a violation of a service-level agreement on a multi-node server, wherein said multi-node server includes a set of server instances that runs a first set of nodes;
   in response to detecting said violation, said multiple node system determining whether to resolve said violation by using a node that is not a member of said first set of nodes to host another server instance of said multi-node server; and
   in response to determining to resolve said violation by using a node that is not a member of said first set of nodes, attempting to resolve said violation by performing steps that include:
      said multiple node system finding another node to use to host a second server instance of said multi-node server, and
      said multiple node system starting said second server instance of said multi-node server on said other node without rebooting said another node.

15. The computer-readable storage medium of claim 14, wherein:
   the steps further include after finding said other node and before starting said second server instance, said node hosts a third server instance; and
   the step of attempting to resolve said violation further includes shutting down said third server instance before starting said server instance.

16. The computer-readable storage medium of claim 15, wherein the step of attempting to resolve said violation includes:
   transmitting a request to a second multi-node server to prepare a server instance to shut down; and
   receiving a message from the second multi-node server indicating that a server instance is prepared to shut down.

17. The computer-readable storage medium of claim 16, wherein:
   the message indicating a server instance is prepared further includes data identifying the second server instance and node.

18. The computer-readable storage medium of claim 14, wherein the step of finding another node further includes:
   generating a set of candidates that correspond to another multi-node server hosted by another set of nodes different than said first set of nodes; and
   selecting a victim from said set of candidates from which to deallocate a node.

19. The computer-readable storage medium of claim 18, wherein:
   the steps further include transmitting a request to a multi-node server corresponding to a candidate of said set of candidates to volunteer to quiesce a server instance on a node; and
   selecting a victim includes selecting a victim from a candidate of a plurality of multi-node servers that transmit, in response to said request to quiesce, a message to volunteer to quiesce.

20. The computer-readable storage medium of claim 19, wherein the step of transmitting a request to a multi-node server includes broadcasting the request to the set of candidates.

21. The computer-readable storage medium of claim 19, wherein the step of selecting a victim from a candidate of a plurality of multi-node servers includes selecting a victim based on one or more factors that include at least one of:
   priority data that is supplied by a user and that indicates a priority of a candidate of said plurality of multi-node servers relative to other candidates of said plurality of multi-node servers; and
   a quiescing cost associated with quiescing a server instance on a node.

22. A computer-readable storage medium carrying one or more sequences of instructions for managing resources in a multiple node system, which instructions, when executed by one or more processors, cause the one or more processors to carry out the steps of:
   a first multi-node server running on a plurality of nodes of said multiple node system, said first multi-node server comprising a plurality of server instances running on said plurality of nodes;
   said first multi-node server receiving a request to acknowledge whether at least one server instance may be relinquished;
   in response to receiving said request, said first multi-node server determining whether using at least one less server instance causes a service-level violation; and
   if said first multi-node server determines that at least one server instance does not cause a service-level violation, then transmitting a message indicating that at least one server instance of a plurality of server instances may be relinquished.

23. The computer-readable storage medium of claim 22, wherein determining whether using at least one less server instance causes a service-level violation includes determining whether a service-level agreement for a type of work performed by said first multi-node server would be violated.

24. The computer-readable storage medium of claim 23, wherein the service-level agreement for a type of work performed is based on a cardinality of server instances allocated to that type of work.

25. The computer-readable storage medium of claim 22, wherein determining whether using at least one less server instance causes a service-level violation includes determining whether there is sufficient available unused CPU utilization to absorb workload of the plurality of nodes with at least one less node.

26. The computer-readable storage medium of claim 22, wherein:

said multiple node system includes a plurality of other multi-node servers including a second multi-node server;

a priority is associated with said plurality of other multi-node servers;

a request for another server-instance for said second multi-node server causes transmitting the request to acknowledge whether at least one server instance may be relinquished;

the steps further include, in response to receiving said message indicating that at least one server instance may be relinquished, allocating said at least one server instance to a multi-node server associated with a higher level of said priority; and said multi-node server associated with a higher level of said priority is either said second multi-node server or a different multi-node server of said plurality of other multi-node servers.

\* \* \* \* \*

UNITED STATES PATENT AND TRADEMARK OFFICE
CERTIFICATE OF CORRECTION

PATENT NO.          : 7,441,033 B2
APPLICATION NO.     : 10/917687
DATED               : October 21, 2008
INVENTOR(S)         : Chidambaran et al.

It is certified that error appears in the above-identified patent and that said Letters Patent is hereby corrected as shown below:

On the title page, item [56]:
On page 2, in column 2, under "Other Publications", line 40, delete "Seraching" and insert -- Searching --, therefor.

In column 7, line 25, after "Cardinality" insert -- : --.

In column 7, line 34, after "Priority" insert -- : --.

In column 7, line 52, after "(i.e. $X_{cpu}$-$N_{cpu}$)" insert -- . --.

In column 7, line 53, delete "Availability Availability" and insert -- Availability: Availability --, therefor.

In column 14, line 59, after "or" delete "the".

Signed and Sealed this

Twentieth Day of April, 2010

David J. Kappos
*Director of the United States Patent and Trademark Office*